US006722085B2

(12) United States Patent
Pittman

(10) Patent No.: US 6,722,085 B2
(45) Date of Patent: Apr. 20, 2004

(54) MOBILE HOME TIE-DOWN APPARATUS

(76) Inventor: Chester L. Pittman, 2225 Adams St., NE., Palm Bay, FL (US) 32905

( * ) Notice: Subject to any disclaimer, the term of this patent is extended or adjusted under 35 U.S.C. 154(b) by 0 days.

(21) Appl. No.: 10/150,235

(22) Filed: May 17, 2002

(65) Prior Publication Data

US 2003/0213192 A1 Nov. 20, 2003

(51) Int. Cl.[7] ................................................. E04C 5/08
(52) U.S. Cl. .............................. 52/23; 52/146; 52/155; 52/169.1; 52/223.1; 52/223.14; 52/DIG. 11
(58) Field of Search .......................... 52/223.1, DIG. 11, 52/143, 122.1, 148, 23, 63, 146, 3, 4, 157, 169.1, 223.14, 83, 5, 155

(56) References Cited

U.S. PATENT DOCUMENTS

| | | | |
|---|---|---|---|
| 3,726,054 A | * | 4/1973 | Anderson et al. .............. 52/23 |
| 3,949,527 A | | 4/1976 | Double et al. |
| 4,015,376 A | | 4/1977 | Gerhardt |
| 4,070,802 A | | 1/1978 | Odom |
| 5,522,184 A | | 6/1996 | Oviedo-Reyes |
| 5,537,786 A | | 7/1996 | Lozier et al. |
| 5,927,905 A | * | 7/1999 | van Halteren ........... 405/252.1 |
| 5,983,572 A | | 11/1999 | Laboy |
| 6,088,975 A | | 7/2000 | Wiegel |
| 6,481,165 B1 | * | 11/2002 | Romary et al. ............. 52/122.1 |

* cited by examiner

*Primary Examiner*—Jeanette Chapman
(74) *Attorney, Agent, or Firm*—John L. DeAngelis, Jr.; Beusse Brownlee Wolter Mora & Maire, P.A.

(57) ABSTRACT

A tie-down apparatus for building structures, including mobile homes. The structure is constructed with a plurality of structural members including channel members disposed therein. In one embodiment, channel members are formed in both the roof structural members and the sidewall structural members. A tie-down cable is disposed within the channels and the two terminal ends thereof releasably engaged with hooks. The hooks are further attached to ground anchors located within the ground adjacent structural sidewalls. A tensioning mechanism is disposed near one terminal and of each of the tie-down cables for simultaneously applying a tensioning force to the tie-down cables, that in turn directs a downward force on the roof structural members thereby retaining the roof in place during high wind conditions.

7 Claims, 2 Drawing Sheets

MOBILE HOME TIE-DOWN APPARATUS

FIELD OF THE INVENTION

The present invention relates to a tie-down apparatus for structures, and more specifically a tie-down apparatus formed integral with the structure, including especially mobile home structures.

BACKGROUND OF THE INVENTION

During high wind conditions, e.g., hurricanes and tornadoes, the roof of a building structure can be separated from the structural walls due to the lifting forces created as the wind passes over the roof at very high speeds. Obviously, serious damage occurs to a building and its contents when the roof separates from the building. In geographic areas where high winds are prevalent, the trend has been to utilize additional roof supporting mechanisms beyond that provided when the structure is constructed.

Mobile homes are especially susceptible to damage and destruction during high wind conditions. Hurricane force winds exert two force components on a mobile home. First, the structure takes a pounding from direct wind contact against a relatively flat surface. Second, as the wind is forced around and up the structural walls on the windward side, a vacuum is created on the opposing or leeward side. Since most mobile homes have an open crawl space below the floor surface and less structural integrity, compared to a structure constructed on site, these two force components can create a potentially destructive situation.

Typical hurricane protection for mobile homes involves the use of anchors and tie-down cables spaced around the structural walls and firmly anchored within the adjacent ground area. Another external structure for protecting mobile homes comprises a net anchored to metal beams that stand vertically against the walls of the home and surround the entire structure. Steel cables tie the beams together and also anchor them to the ground. The net placed over the roof increases the roof wind resistance and lowers the probability of roof lift.

BRIEF SUMMARY OF THE INVENTION

A mobile home or other structure is protected against wind damage, especially roof lift, according to the anchoring system of the present invention. During construction of the mobile home, a plurality of parallel channels are formed within the roof and walls structural members, in one embodiment running from one side of the mobile home across the roof to the opposing side. A chain or cable is placed within the channel and each end is terminated with a hook or anchoring device. Anchor bolts are placed in the ground below the perimeter walls of the mobile home and the hook devices are releasably engaged with the ground anchors. Each of the cables is also attached to a ratcheted axle for applying a tension force to the cables, and thus a downwardly directed force on the roof. The cables can be tensioned after the mobile home is moved into place or only when a high wind storm is expected, thereby avoiding excessive roof forces during normal weather conditions.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Figure 1:
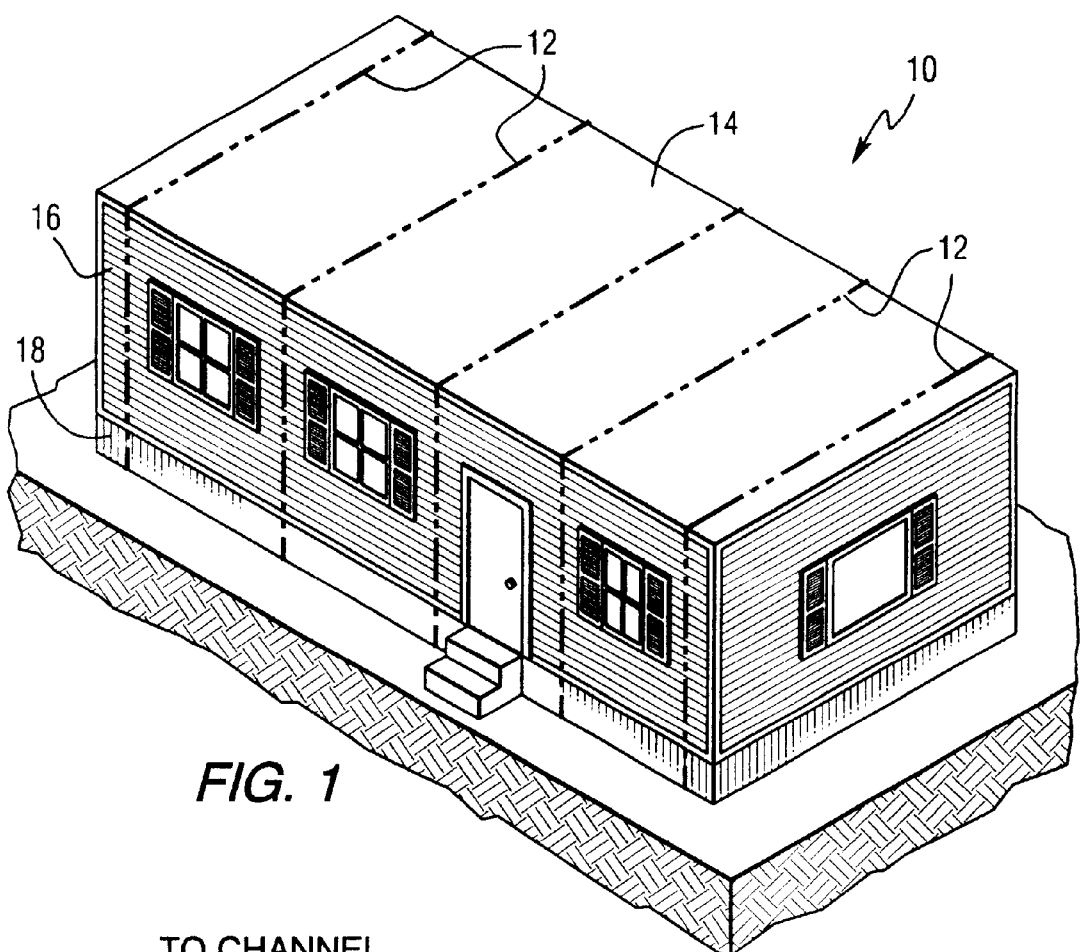
FIG. 1 is a perspective view of a mobile home to which the teachings of the present invention can be applied.

Before describing in detail the particular tie-down apparatus in accordance with the present invention, it should be observed that the present invention resides primarily in a novel and non-obvious combination of hardware elements related to a roof structure tie-down apparatus. Accordingly, the hardware elements have been represented by conventional elements in the drawings, showing only those specific details that are pertinent to the present invention so as not to obscure the disclosure with structural details that will be readily apparent to those skilled in the art having the benefit of the description herein.

FIG. 1 illustrates an exemplary mobile home 10 including tie-down cables 12 embedded within a roof 14 and opposing side walls 16, and thus shown in phantom. As is known, the mobile home 10 is raised above ground level forming a crawlspace between the floor surface of the mobile home 10 and the ground over which the mobile home is situated. Typically, the crawl space is enclosed by a skirt 18 mounted on all sides of the mobile home 10. Although ideally the tie-down cables 12 are equally spaced across the roof 14, this may not always be the case due to the presence of windows and doors in the sidewalls 16. Thus as shown, certain of the tie-down cables 12 may be displaced from the on-center position. The tie-down cables 12 exit the sidewalls 16 of the mobile home 10 immediately behind the skirt 18. Although illustrated as applied to a mobile home, the teachings of the present invention are equally applicable to other structures, including houses and commercial buildings.

Figure 2:
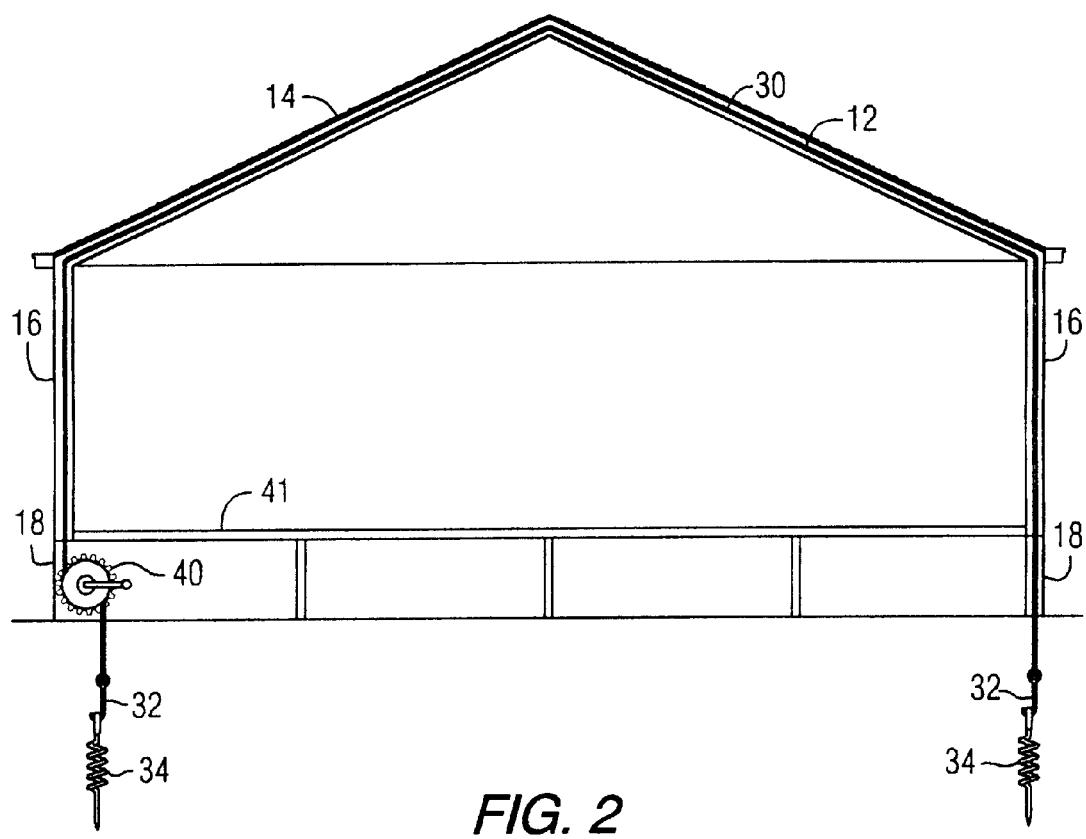
FIG. 2 is a cross sectional view of a structure or mobile home incorporating the tie-down apparatus of the present invention.

FIG. 2 is a cross section through the mobile home 10 showing a single tie-down cable 12 within a channel 30 formed within the structural members supporting the roof 14 and the sidewalls 16 during the construction thereof. In the preferred embodiment the channel is formed in the structural wall and roof members, e.g., roof trusses and wall studs. In lieu of a channel formed within these structural members, the tie down cables 12 can be located within a tubular member attached to the structural members. In one embodiment the tubular member can be affixed to the structural members after fabrication of the structure skeleton, but prior to construction of the interior and exterior skins (i.e., the roof, ceiling and inner and outer wall surfaces. Note that FIG. 2 illustrates a peaked roof while the FIG. 1 embodiment shows a flat roof. The teachings of the present invention can be applied to any roof configuration.

As further illustrated in FIG. 2, the tie-down cable 12 is accessible from below the mobile home 10. As seen, both terminating ends of the tie-down cable 12 are attached to a hook 32 that is further releasably engaged with a ground screw 34. Thus each end of the tie-down cable 12 is releasably connected to one of the screw anchors 34 by way of the hook 32. In another embodiment, the anchor screw can be replaced with any of the known anchoring elements, including, for example, an anchor bolt embedded in a concrete pad to which the hook 32 is then attached.

As further shown in FIG. 2, a wind-up mechanism 40 is fixedly secured to a bottom frame member 41 of the mobile home 12, by for example, forming a welded joint or a using a bolt and mating nut attachment system. Alternatively, the wind-up mechanism 40 can be fixedly attached to the adjacent ground surface using any of the well-known anchoring techniques. Advantageously, the tie-down cables 12 are assembled to the wind-up mechanism 40 during assembly of the mobile home 12. Prior to arrival of the mobile home at the site, the screw anchors 34 are placed as required for later attachment of the hooks 34. Thus upon arrival at the site, the hooks 32 are attached to the screw anchors 34 and the wind-up mechanism 40 operated to tension the tie-down cables and apply a downwardly directed force to the mobile home 12.

Figure 3:
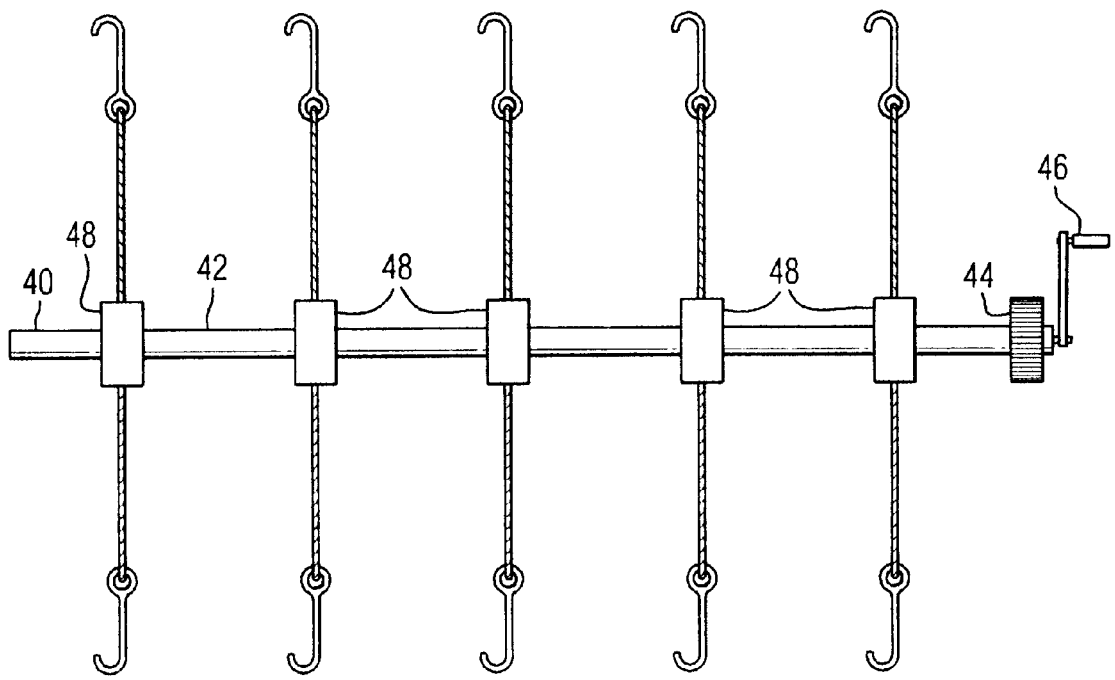

FIG. 3 illustrates the wind-up mechanism 40, comprising an axle 42 rigidly affixed to a ratchet 44 driven by a crank 46. The axle 42 further includes a plurality of hubs 48 around which the like plurality of tie-down cables 12 are wound (or unwound) by manual rotation of the crank 46. The ratchet 44 includes a conventional pawl mechanism for allowing rotation in the desired direction, while also engaging and holding the ratchet 44 in position once the tie-down cables 12 have been tensioned. When it is desired to tension the tie-down cables 12 to exert a downwardly directed force on the roof 14, the wind-up mechanism is operated, manually in one embodiment, to coil the tie down cables about the hubs 48. To release the tension forces, the pawl is disengaged from the ratchet wheel 44 and the crank 46 manually turned to loosen the tie-down cables 12 and relieve the cable tension.

Figure 4:
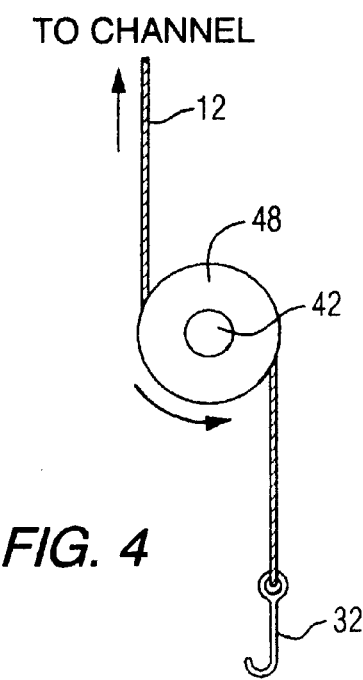
FIGS. 3 and 4 illustrate the cable tensioning elements of the tie-down apparatus.

FIG. 4 illustrates an end view of a single hub 48 including the orientation of the tie-down cable 12 with respect thereto. In the exemplary embodiment of FIG. 4, counterclockwise rotation of the shaft 42 using the crank 46, tensions the tie-down cable 12, including both segments thereof, that is, the segment running within the channel 30 and the segment affixed to the hook 32.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. For example, although the present invention has been described with reference to a mobile home, the teachings thereof can also be applied to other building structures and to material stacks or loads. In addition, modifications may be made to adapt a particular situation to the teachings of the present invention without departing from its essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A tie-down apparatus for a structure having a roof and sidewalls, said tie-down apparatus comprising:

a plurality of parallel spaced-apart channel forming members, wherein each channel forming member comprises a substantially vertical section disposed within each of two opposing sidewalls and a substantially horizontal section disposed within the roof;

a plurality of tie-down cables, wherein one of said plurality of tie-down cables is disposed in the vertical and horizontal sections of said plurality of channel forming members;

a plurality of ground anchors on two opposing sides of the structure and connected to terminal ends of each one of said plurality of tie-down cables; and a tensioning mechanism to which the plurality of tie-down cables are attached for applying a downwardly directed force to the roof by the application of a tension force to the plurality of tie-down cables.

2. The apparatus of claim 1 wherein the ground anchors are selected from among helical ground screw anchors and anchor eye bolts.

3. The apparatus of claim 1 wherein the tension mechanism comprises a ratcheted wind-up mechanism for tensioning the plurality of tie-down cables.

4. The apparatus of claim 1 wherein the plurality of tie-down cables are selected from among a chain, a metal cord and a metal rope.

5. The apparatus of claim 1 wherein the channel forming members comprise a structural member having channels formed therein.

6. The apparatus of claim 1 wherein the structure comprises a plurality of structural members and a surface member formed thereover, wherein the plurality of channel-forming members comprise channels formed within the structural members.

7. The apparatus of claim 6 wherein the plurality of channel-forming members comprise a tubular structure attached to each of the plurality of structural members.

* * * * *